US010304353B1

(12) United States Patent
Lozano et al.

(10) Patent No.: US 10,304,353 B1
(45) Date of Patent: May 28, 2019

(54) TRAY-AND-BLOCK APPARATUS FOR DEVICE PROGRAMMING

(71) Applicants: Delfin Lozano, Longmont, CO (US); Lindsay Craig, Longmont, CO (US)

(72) Inventors: Delfin Lozano, Longmont, CO (US); Lindsay Craig, Longmont, CO (US)

( * ) Notice: Subject to any disclaimer, the term of this patent is extended or adjusted under 35 U.S.C. 154(b) by 341 days.

(21) Appl. No.: 15/237,572

(22) Filed: Aug. 15, 2016

(51) Int. Cl.
    G06F 8/34      (2018.01)
    G09B 1/30      (2006.01)
    G09B 19/00     (2006.01)
    F01M 1/02      (2006.01)
    A63H 33/04     (2006.01)

(52) U.S. Cl.
    CPC ........... *G09B 19/0053* (2013.01); *G06F 8/34* (2013.01); *G09B 1/30* (2013.01); *A63H 33/042* (2013.01)

(58) Field of Classification Search
    CPC .... A63H 2200/00; A63H 33/042; G06F 8/34; G09B 19/0053; G09B 1/30
    See application file for complete search history.

(56) References Cited

U.S. PATENT DOCUMENTS

| 6,175,954 B1 * | 1/2001 | Nelson | G06F 8/34 |
| | | | 717/105 |
| 9,128,661 B2 * | 9/2015 | Zilber | A63F 13/80 |
| 2005/0026537 A1 * | 2/2005 | Hsieh | A63H 33/08 |
| | | | 446/330 |
| 2017/0004730 A1 * | 1/2017 | Kim | G09B 5/00 |

FOREIGN PATENT DOCUMENTS

WO    WO-2018007515 A1 *  1/2018  ............... G06F 8/34

\* cited by examiner

*Primary Examiner* — Michael C Zarroli
(74) *Attorney, Agent, or Firm* — Derek Pressley (57) ABSTRACT

The present invention provides an educational device for teaching various subjects utilizing a tray with an array of contact-embedded recesses for receiving a plurality of stackable blocks with corresponding contacts. Each block includes an electrical component such as resistors and/or capacitors, the value of which is ascertained by a processing circuit within the tray. Each block represents a particular portion of program code, such that the placement of the blocks creates program code comprising the code portions represented by the blocks. Upon a button press by the user the tray then sends information about the blocks present on the tray to an output device. The tray has the capability of sending messages representing the blocks to a variety of outputs via a wireless communication device.

14 Claims, 8 Drawing Sheets

TRAY-AND-BLOCK APPARATUS FOR DEVICE PROGRAMMING

FIELD OF THE INVENTION

The present invention relates broadly to educational devices, and more specifically to a modular system for programming devices using physical objects to implement computer instructions.

BACKGROUND OF THE INVENTION

Subjects such as computer science are taught in all countries to large numbers of students. Traditional education in computer science and other subjects is time-intensive and focused initially on reading large amounts of text and then applying what is learned to attempts at writing code. In computer science, learning to write computer programs can be an intimidating task. In order to write a program, a user may need to be aware of the commands that are available in the programming language. Frustration arises when a program fails due to syntax errors, such as misspelling or misplacing a term in a line of code, requiring the student to debug and repair the statement. Thus, errors in language, logic and syntax in programming code written by beginners requires correction or "debugging," which, even in a relatively simple program may take a novice programmers considerable amounts of time and raise frustration levels, resulting in some students giving up and ending their studies. Programmers routinely code using editors, but such editors are not readily accessible to novice programmers. Novice programmers may not have a developed understanding of software commands, concepts and syntax, and the text-based editors do not provide a level of vision to assist novice programmers adequately.

SUMMARY OF THE INVENTION

The present invention provides an educational device for programming devices utilizing a tray with an array of contact-embedded recesses for receiving a plurality of stackable blocks with corresponding contacts. Each block includes an electrical component such as resistors and/or capacitors, the value of which is ascertained by software operating on a processing circuit within the tray. Each block represents a particular portion of program code, such that the placement of the blocks creates program code comprising the code portions represented by the blocks.

In one aspect, the present invention provides a tray-and-block apparatus for teaching device programming, having a tray, the tray having a plurality of recesses containing electrical connections for positive and negative charge, the tray connected to a power source that provides electrical power to recesses in the plurality; a plurality of programming blocks, each programming block in the plurality of blocks configured to insert into a recess in the plurality of recesses in the tray, each programming block including a positive electrical connection and a negative electrical connection and an electrical element connected between the positive electrical connection and the negative electrical connection, wherein programming blocks placed in a sequence on the tray combine to represent commands issued to a device based on the electrical characteristic of the block and its placement on the tray in relation to other blocks placed on the tray. In an embodiment, blocks are placed directly into recesses in the plurality of recesses. In an embodiment, blocks are stacked vertically in a single recess. In an embodiment, blocks in the plurality include magnets on their bottom surface. In an embodiment, recesses in the tray include magnets. In an embodiment, the electrical element comprises a resistor. In an embodiment, the electrical element comprises a capacitor. In an embodiment, the blocks include recessed electrical connections on its bottom surface. In an embodiment, the recesses in the tray include protruding electrical connections. In an embodiment, a transceiver is included for wireless communication with the tray.

Many other features and advantages of the present invention will be realized from reading the following detailed description, when considered in conjunction with the drawings.

DETAILED DESCRIPTION

Figure 1:
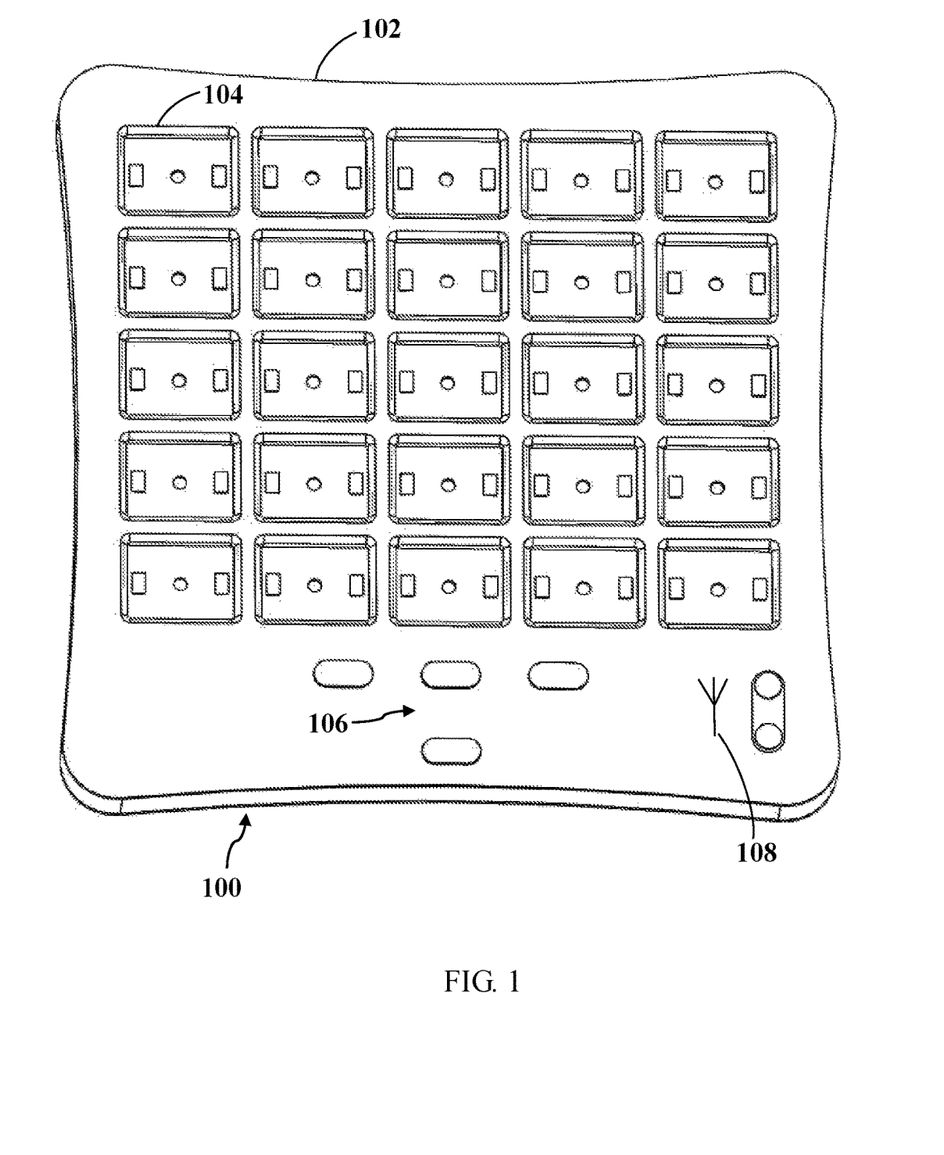
FIG. 1 is a plan view of a tray-and-block device programming apparatus.
Figure 2:
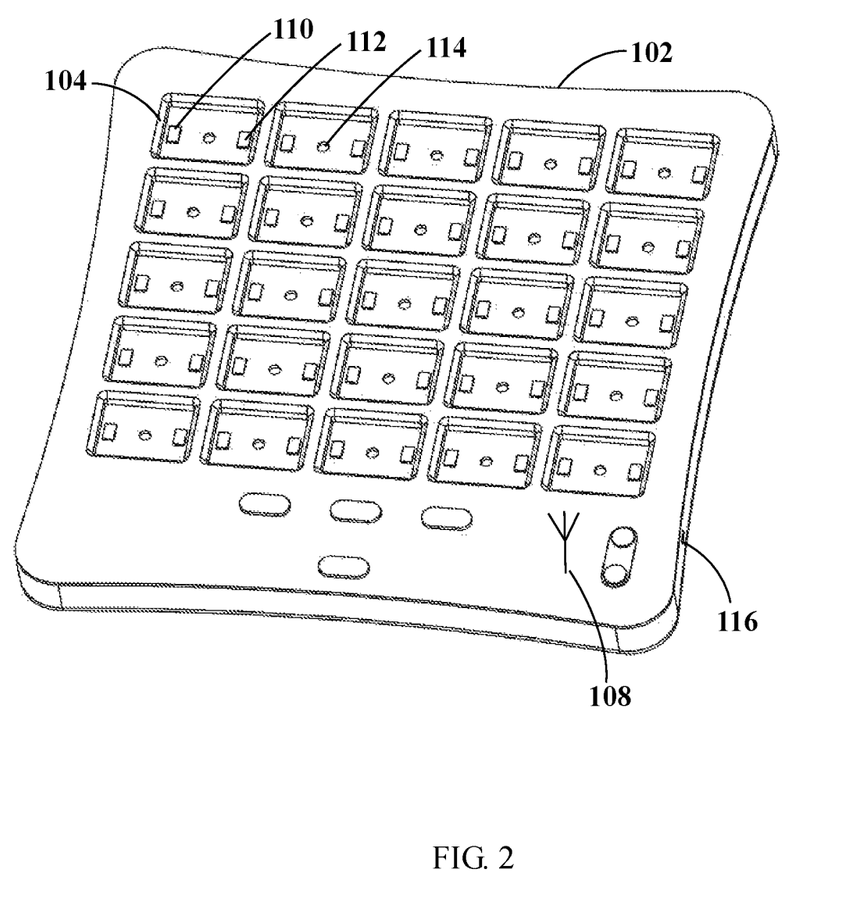
FIG. 2 is a perspective view of the tray-and-block device programming apparatus of FIG. 1.

Directing attention to FIG. 1, there is shown a plan view of a tray used in a tray-and-block device programming apparatus 100. Tray 102 is formed in a substrate that includes a plurality of recesses 104 laid out in a grid configuration, such that the recesses are spaced across tray 102 in rows and columns that are easily observed by a human user. Also located on tray 102 are a series of selector buttons 106 that can be programmed to perform various functions such as power on/off, execute, connect or communicate with a device, select one or more output devices with which the tray will wirelessly communicate, or other functions with respect to tray-and-block device programming apparatus 100. In an embodiment, tray 102 includes a wireless transceiver 108, including a radio transmitter and receiver configured to communicate in a wireless environment to a computing device through which a user develops programming code Directing attention to FIG. 2, tray 102 is shown in a perspective view so that the depth of recesses 104 is shown. In each recess 104, there is a pair of electrical connectors protruding slightly from the bottom surface of recess 104, one for positive (connector 110) and one for negative (connector 112), so that electrical current is supplied to each recess 104. Tray 102 supplies electrical power to each pair of connectors from underneath tray 102, and can be either alternating current supplied by an electrical cord or a battery under tray 102. In the center of each recess 104, a magnet 114 is provided to retain programming blocks placed therein. On the side of tray 102, a connection port 116 is provided for communication to either a device controlled by tray-and-block programming apparatus 100, a computing device that communicates with tray-and-block programming apparatus 100, or simply is a power port through which electrical power is provided to tray-and-block programming apparatus 110.

Figure 3:
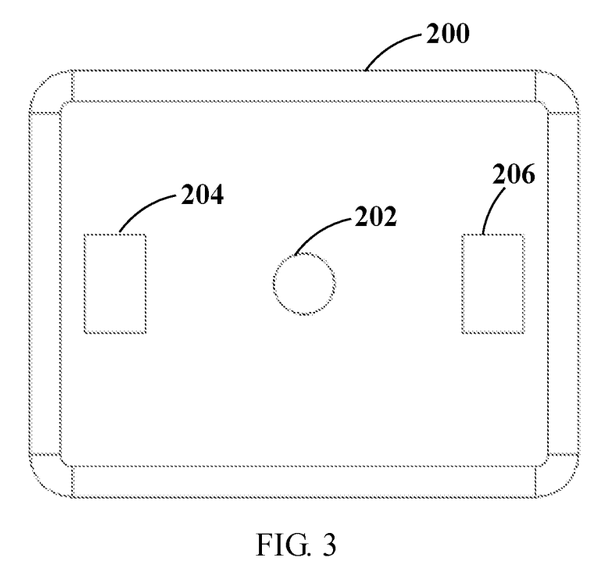
FIG. 3 a plan view as viewed from the bottom of a programming block.

FIG. 3 a plan view as viewed from the bottom of a programming block 200. As shown, magnet 202 is configured to be in the center of the bottom surface of block 200, and forms a magnetic connection with magnet 114 when placed in recess 104. Block 200 also includes two slightly recessed electrical connectors, positive connector 204 and negative connector 206, which are brought into contact with connectors 110 and 112, respectively, when block 200 is placed in recess 104, such that electrical current flows from tray 102 through block 200.

Figure 4:
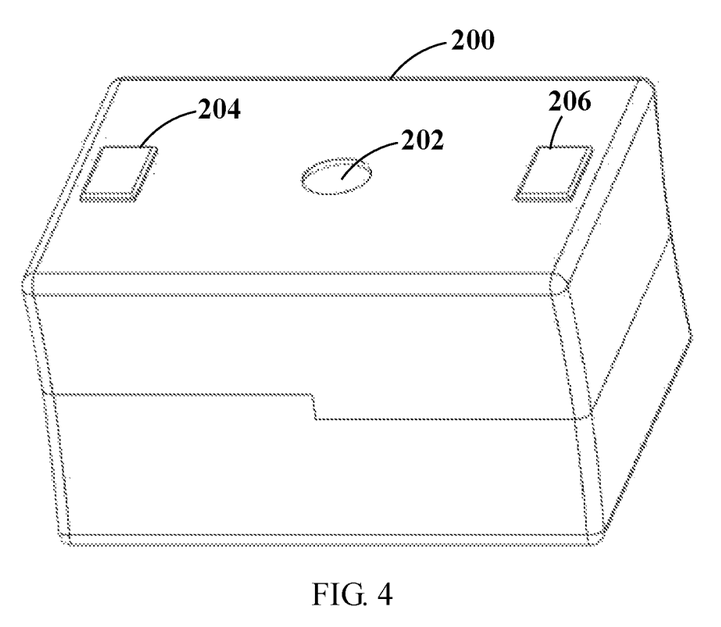
FIG. 4 is a perspective view of the programming block shown in FIG. 3.

FIG. 4 is a perspective view of the programming block 200 shown in FIG. 3. Electrical connectors 204 and 206 are shown protruding though the top of block 200, so that multiple blocks can be stacked vertically and be connected electrically.

Figure 5:
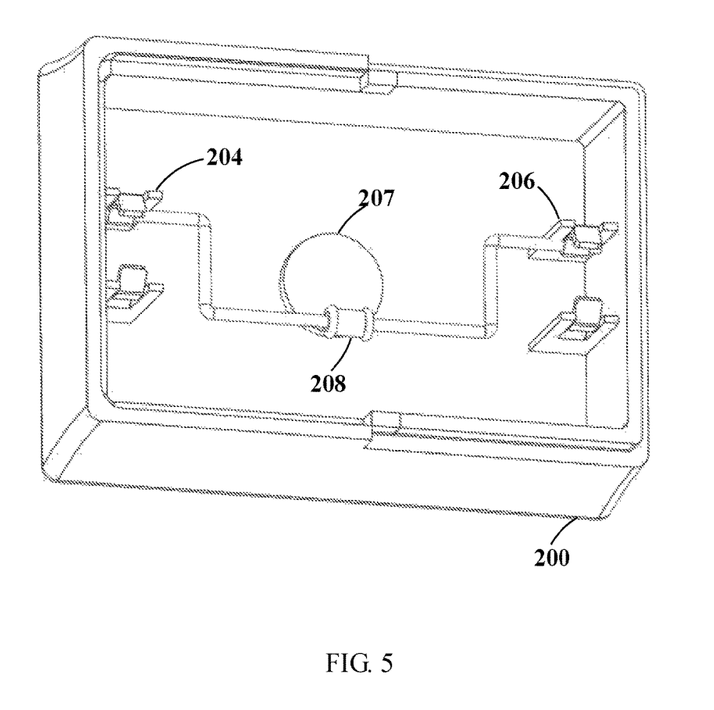
FIG. 5 is a cutaway perspective view of the programming block shown in FIGS. 3-4 showing internal elements.

FIG. 5 is a cutaway perspective view of the programming block 200 shown in FIGS. 3-4 showing internal elements. Magnet holder 207 is configured in the center of the block, near the bottom surface, to retain magnet 202. As shown, connected electrically between connectors 204 and 206 is electrical element 208. Electrical element 208 in one embodiment is a resistor. The resistor chosen for a specific block 200 may have the same resistance as other blocks, or the resistance can change from block to block. Electrical element 208 in another embodiment is a capacitor. Again, the capacitance of electrical element 208 can be the same as in other blocks having capacitors, or the capacitance can vary from block to block. Resistors and capacitors are chosen for various embodiments because their electrical characteristics are easily detected and measured, which makes blocks unique and assignable to various device programming functions and keywords. Resistors and capacitors are described herein as illustrative examples, but other electrical elements, such as transistors, can also be used in various embodiments.

Figure 6:
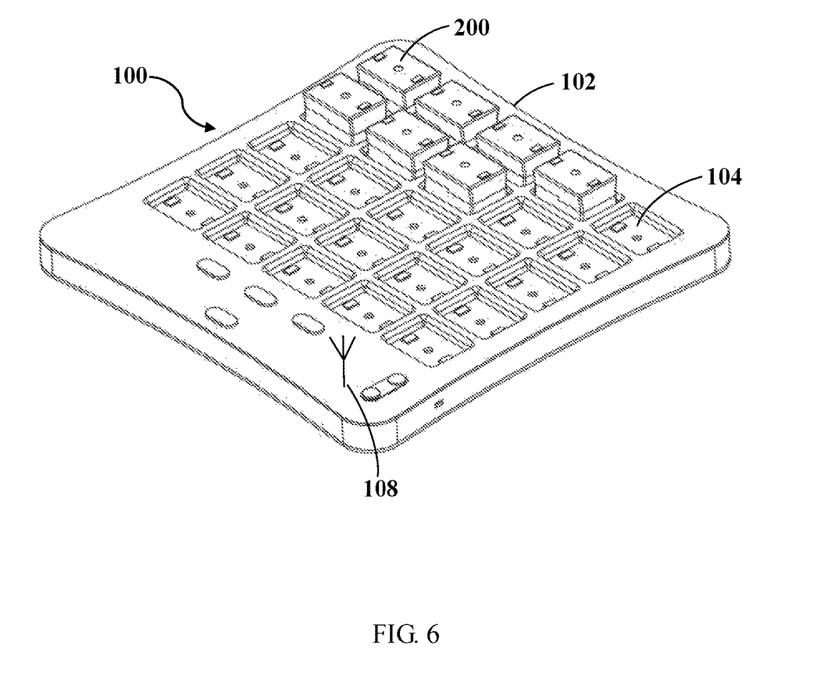
FIG. 6 is a perspective view of the tray-and-block device programming apparatus with four blocks placed in an upper row and three blocks placed in a row underneath the upper row.

FIG. 6 is a perspective view of the tray-and-block device programming apparatus 100 with four blocks placed in an upper row and three blocks placed in a row underneath the upper row. The placement and sequence of blocks 200 in tray 102 is useful in teaching device programming. Various configurations are possible, as there is a large number of unique combinations of placed blocks. Tray 102 is configured to present rows and columns of recesses 104, which can be used for sequences of computer instructions executable to control a device in communication with tray-and-block device programming apparatus 100. In one embodiment, rows of recesses 104 can be assigned to different functions, for example, each row operating a limb on a robot. Thus, blocks in a row represent a sequence of instructions sent to the device under control to operate a limb. Various blocks can modify commands so that additional controls can be implemented. For example, a robotic hand grasping an item can be made to grasp it gently, or firmly, depending on the resistance or capacitance observed in a particular block placed in a particular recess 104.

Figure 7:
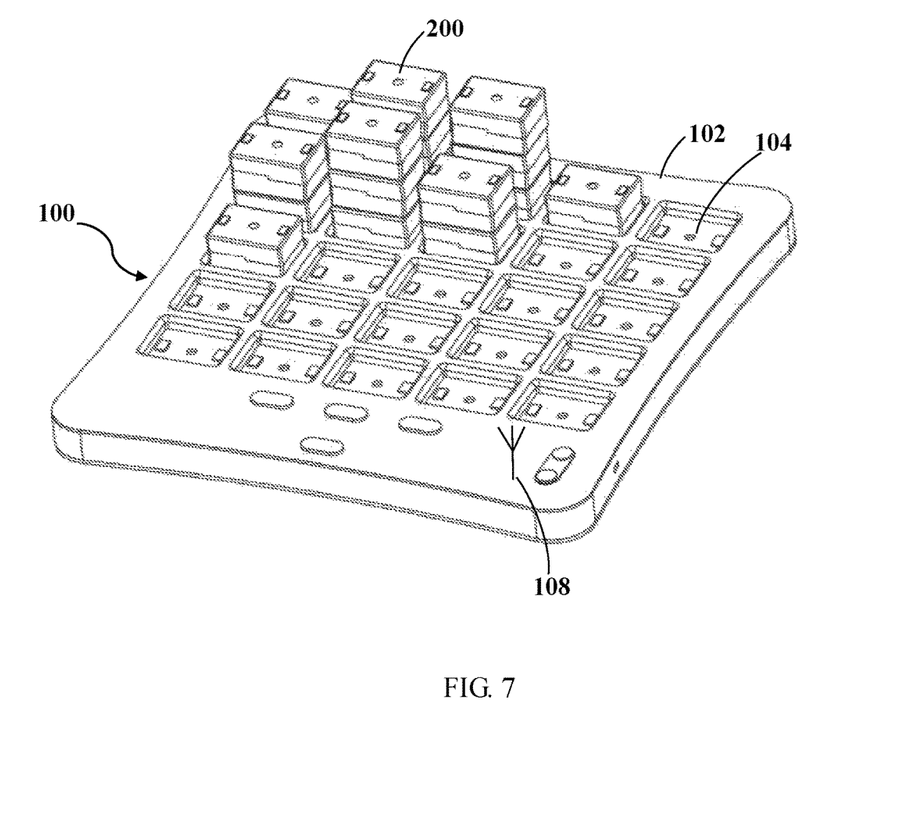
FIG. 7 shows the perspective view of FIG. 6 with additional programming blocks stacked vertically on some of the blocks shown in FIG. 6.
Figure 8:
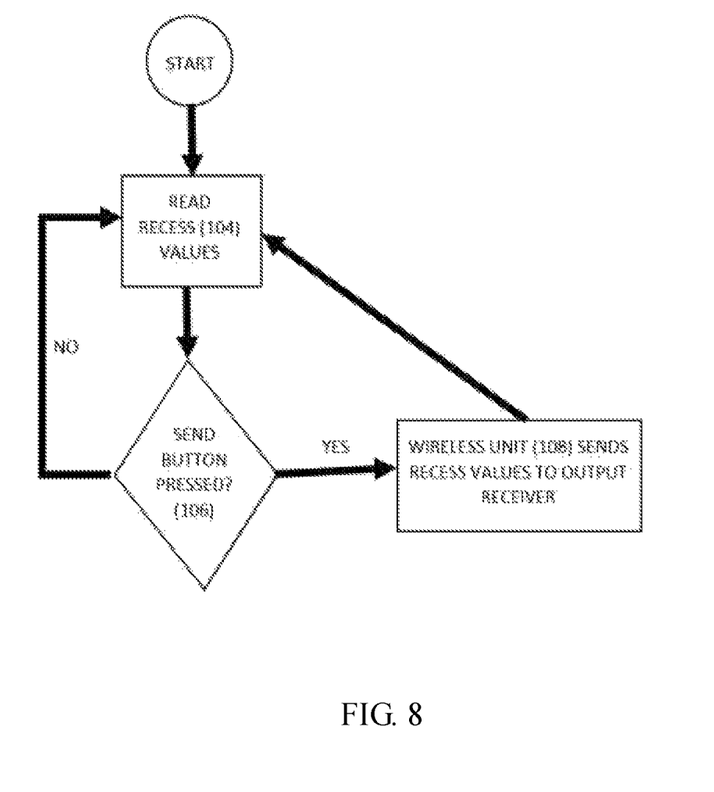
FIG. 8 is a logic flow chart showing the core process the tray-and-block device uses to read the values of the blocks, sending the results to an output when the user presses a button.

Alternatively, all recesses 104 can be used to control a single device. When a row of commands is executed, a sequence of commands can resume on the following row. FIG. 7 shows the perspective view of FIG. 6 with additional programming blocks stacked vertically on some of the blocks shown in FIG. 6. Blocks 200 are constructed to be stacked vertically; electrical connections 204 and 206 are brought in contact with the same electrical connections on additional blocks. Combining blocks vertically leads to increased resistances and capacitances, thus changing the electrical characteristics for an individual recess 104.

Alternatively, columns of vertically-stacked blocks 200 can represent commands with several variables, which can be realized by different blocks. The grasp command example above can position the robotic arm after reading the bottom block, grasp an object after reading another block on top of the bottom block, and control the firmness of the grasp after reading the top block.

Alternatively, the tray-and-block device programming apparatus 100 can be used to create an operating system for a computer by ascribing various kernel keywords for constructing commands based on positions of various recesses 104 on tray 102. While the above examples described control of a device such as a robot, defining a kernel for an operating system is easily implemented tray-and-block device programming apparatus 100 as the strength of an operating system is often determined by how few keywords are included in its kernel. For example, a read command can be defined as either a sequence of blocks appearing in a row, or in a single vertical stack.

Figure 9:
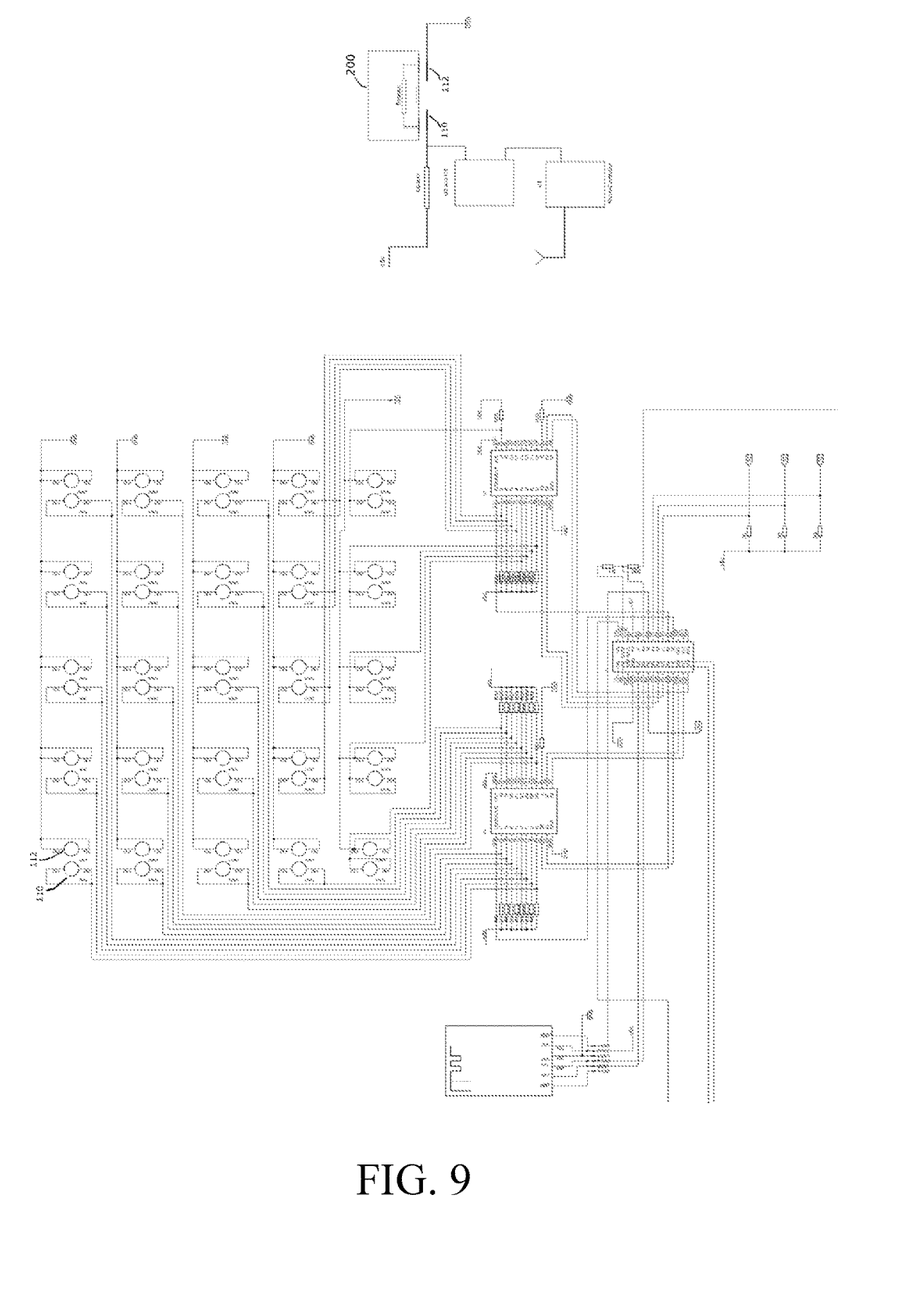
FIG. 9 is a schematic of a preferred electric circuit which may be used in the tray-and-block device programming apparatus of the invention.

FIG. 9 shows a preferred electrical circuit schematic which may be used in tray-and-block device programming apparatus 100 to carry out the logical operations as described herein. An electric circuit board (not shown) with the electrical component layout illustrated by the schematic of FIG. 9 is preferably attached to the bottom side of tray 102.

While the present invention is described herein in detail with respect to teaching computer programming, it is to be understood that a variety of subjects other than computer science may be taught using embodiments of the present invention, such as music, literature, language, engineering, and other technologies and subjects.

In an embodiment, a processing circuit is incorporated into the tray to provide simple communication between individual recesses 104 and a device under control of the tray-and-block device programming apparatus 100 or for communication with a computer through which a user operates the tray 102 to read a particular recess 104 to observe its electrical characteristics, or to selectively provide power to the recess 104 and thus execute a command through one or more blocks. In an embodiment, the controller is connected to transceiver 108. In an embodiment, the controller is connected to port 116 to communicate over a wire medium.

While a tray-and-block programming apparatus has been illustrated and described in detail, it is to be understood that the examples above are illustrative of the flexibility of application of the present invention in various embodiments, and not limiting. It is to be understood that many modifications can be made to the various embodiments described here without departing from the spirit of the invention.

What is claimed is:
1. A device programming apparatus, comprising:
a tray, the tray having a plurality of recesses containing electrical connections for positive and negative charge, the tray connected to a power source that provides electrical power to recesses in the plurality; and a plurality of programming blocks, each programming block in the plurality of blocks configured to insert into a recess in the plurality of recesses in the tray, each programming block including a positive electrical connection and a negative electrical connection and an electrical element connected between the positive electrical connection and the negative electrical connection, wherein programming blocks placed in a sequence, and are stackable vertically in a single recess on the tray, combine to represent commands issued to a device based on the electrical characteristic of the block and its placement on the tray in relation to other blocks placed on the tray.

2. A device programming apparatus, comprising:

a tray, the tray having a plurality of recesses containing electrical connections for positive and negative charge, the tray connected to a power source that provides electrical power to recesses in the plurality; and a plurality of programming blocks, each programming block in the plurality of blocks configured to insert into a recess in the plurality of recesses in the tray, each programming block including a positive electrical connection, a negative electrical connection, an electrical element connected between the positive electrical connection and the negative electrical connection, and a magnet on the block's bottom surface, wherein programming blocks placed in a sequence on the tray combine to represent commands issued to a device based on the electrical characteristic of the block and its placement on the tray in relation to other blocks placed on the tray.

3. A device programming apparatus, comprising:

a tray, the tray having a plurality of recesses containing electrical connections for positive and negative charge and a magnet, the tray connected to a power source that provides electrical power to recesses in the plurality; and a plurality of programming blocks, each programming block in the plurality of blocks configured to insert into a recess in the plurality of recesses in the tray, each programming block including a positive electrical connection and a negative electrical connection and an electrical element connected between the positive electrical connection and the negative electrical connection, wherein programming blocks placed in a sequence on the tray combine to represent commands issued to a device based on the electrical characteristic of the block and its placement on the tray in relation to other blocks placed on the tray.

4. A device programming apparatus, comprising:

a tray, the tray having a plurality of recesses containing electrical connections for positive and negative charge, the tray connected to a power source that provides electrical power to recesses in the plurality; and a plurality of programming blocks, each programming block in the plurality of blocks configured to insert into a recess in the plurality of recesses in the tray, each programming block including a positive electrical connection and a negative electrical connection and a resistor connected between the positive electrical connection and the negative electrical connection, wherein programming blocks placed in a sequence on the tray combine to represent commands issued to a device based on the electrical characteristic of the block and its placement on the tray in relation to other blocks placed on the tray.

5. A device programming apparatus, comprising:

a tray, the tray having a plurality of recesses containing electrical connections for positive and negative charge, the tray connected to a power source that provides electrical power to recesses in the plurality; and a plurality of programming blocks, each programming block in the plurality of blocks configured to insert into a recess in the plurality of recesses in the tray, each programming block including on its bottom surface a recessed positive electrical connection, a recessed negative electrical connection and an electrical element connected between the positive electrical connection and the negative electrical connection, wherein programming blocks placed in a sequence on the tray combine to represent commands issued to a device based on the electrical characteristic of the block and its placement on the tray in relation to other blocks placed on the tray.

6. A device programming apparatus, comprising:

a tray, the tray having a plurality of recesses containing protruding electrical connections for positive and negative charge, the tray connected to a power source that provides electrical power to recesses in the plurality; and a plurality of programming blocks, each programming block in the plurality of blocks configured to insert into a recess in the plurality of recesses in the tray, each programming block including a positive electrical connection and a negative electrical connection and an electrical element connected between the positive electrical connection and the negative electrical connection, wherein programming blocks placed in a sequence on the tray combine to represent commands issued to a device based on the electrical characteristic of the block and its placement on the tray in relation to other blocks placed on the tray.

7. A computer programming apparatus utilizing tangible objects representing computer program code, comprising:

a tray having an array of pairs of electrical connections arranged on a substrate thereof;

a voltage divider on said tray and in circuit with said pairs of electrical connections;

a microcontroller on said tray and in circuit with said voltage divider, utilizing software that assigns program code values to voltage input received from said voltage divider;

a plurality of programming blocks, each programming block having a pair of counterpart electrical connections configured to complement one pair of said array of pairs of electrical connections of said tray when said block is placed on said tray; and an electrical element carried by each of said blocks, and in circuit between said pair of counterpart electrical connections.

8. The computer programming apparatus of claim 7, further comprising an electric switch on said tray and in circuit with said microcontroller and said voltage divider, that changes voltage input values received by said microcontroller.

9. The computer programming apparatus of claim 7, wherein said array of pairs of electrical connections protrude through apertures within said substrate.

10. The computer programming apparatus of claim 9, further comprising:

a magnet adjacent each pair of electrical connections of said array of pairs, and carried by said tray;
a magnet carried by each block of said plurality of programming blocks, and situated adjacent said counterpart pair of electrical connections.

11. The computer programming apparatus of claim 10, wherein each block of said plurality of programming blocks comprise:
   a bottom face, to which said pair of counterpart electrical connections are mounted;
   a top face, opposite said bottom face; and
   a second pair of electrical connections mounted on said top face, and in circuit with said electrical element.

12. A computer programming apparatus utilizing tangible objects representing computer program code, comprising:
   a tray having an array of pairs of electrical connections arranged on a substrate thereof;
   a processing circuit in circuit with said array of pairs, assigning program code values to electrical input received from said array of pairs;
   an electric switch on said tray and in circuit with said processing circuit, that changes input values received by said processing circuit;
   a plurality of programming blocks, each programming block having a pair of counterpart electrical connections configured to complement one pair of said array of pairs;
   an electrical element carried by each block of said plurality of programming blocks and in circuit between said pair of counterpart electrical connections,
   wherein each block of said plurality of programming blocks comprise:
      a bottom face, to which said pair of counterpart electrical connections are mounted;
      a top face, opposite said bottom face; and
      a second pair of electrical connections mounted on said top face, and in circuit with said electrical element.

13. A computer programming apparatus utilizing tangible objects representing computer program code, comprising:
   a tray having an array of pairs of electrical connections arranged on a substrate thereof; and
   a plurality of programming blocks, each programming block having
      a pair of counterpart electrical connections configured to complement one pair of said array of pairs of electrical connections of said tray when said block is placed on said tray, and
      a resistive electrical element connected between said pair of counterpart electrical connections
   wherein programming blocks placed in a sequence on said tray combine to represent commands issued to a device based on the electrical characteristics of said blocks and their placement on said tray in relation to other blocks placed on said tray.

14. The computer programming apparatus of claim 13, wherein said programming blocks are stackable vertically on a single pair of electrical connections of said array of pairs of electrical connections on said tray.

* * * * *